Patented Nov. 29, 1949

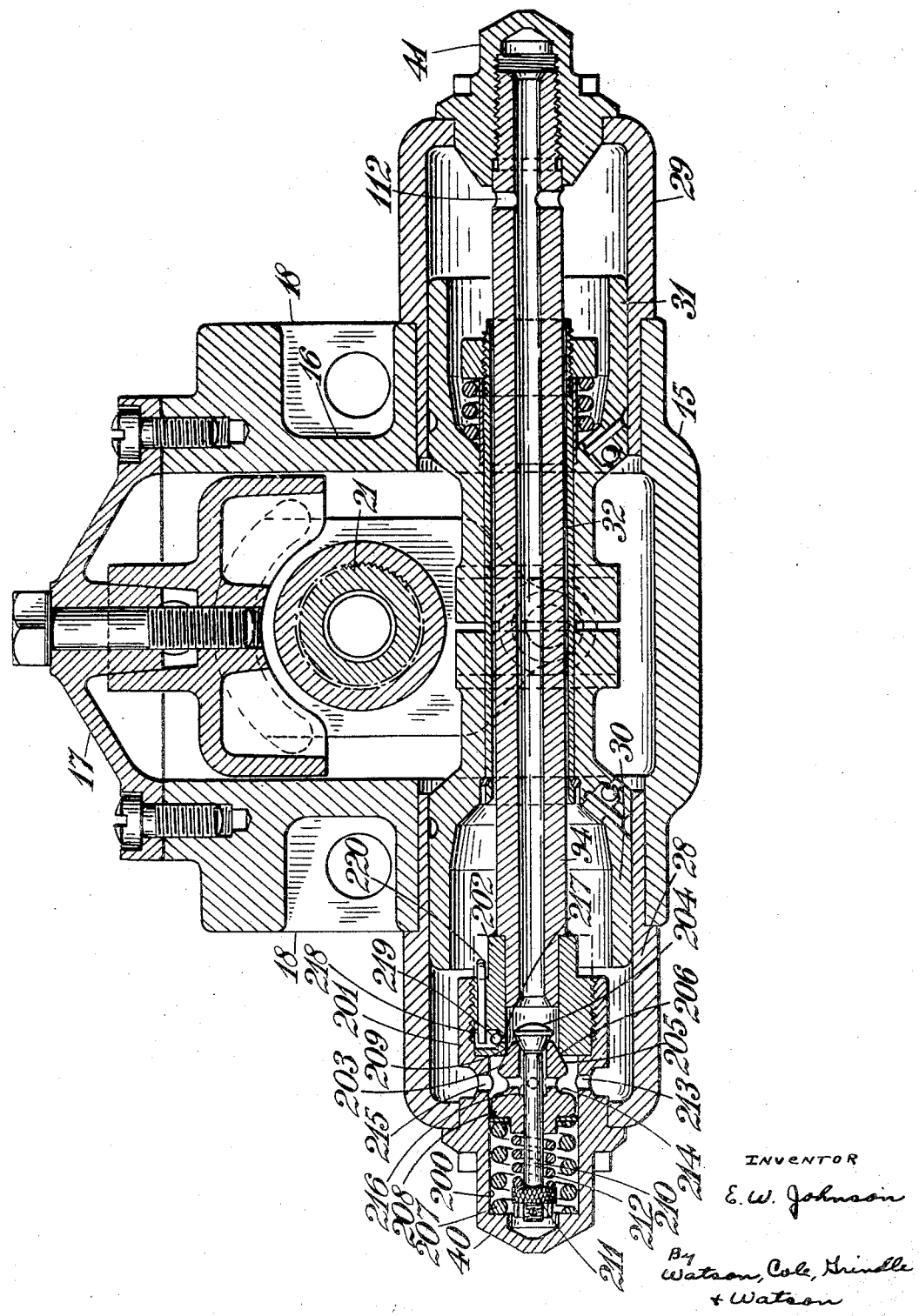

2,489,783

UNITED STATES PATENT OFFICE 2,489,783

SHOCK ABSORBER

Ernest William Johnson, Birmingham, England, assignor to Vandervell Products Limited, London, England, a British company Application February 9, 1948, Serial No. 7,050
In Great Britain January 20, 1947

Section 1, Public Law 690, August 8, 1946

1 Claim. (Cl. 188—88)

This invention is for improvements in or relating to shock absorbers, and has for one of its objects to provide suitable relief for pressures developing in the shock absorber while ensuring that there shall not be leakage such as will undesirably relieve the pressures. Another object of the invention is to provide a simple and compact contruction and arrangement of certain of the parts of the shock absorber.

The invention is concerned with double-acting shock absorbers of the type in which a restricted passage for the flow in both directions of damping fluid between two fluid containers, at the opposite ends of the shock absorber, is provided between the opposed surfaces of a metering rod and a bore into which the rod reaches, and in which a by-pass for the said restricted passage is provided through the interior of the metering rod, travel of the fluid through which by-pass to relieve the pressure set up by the flow of fluid through the said restricted passage in both directions is controlled by two valves nested together and appropriated one to each direction of travel of the fluid through the said restricted passage and both operated by the pressure of the fluid. The nested valves are located in one of the fluid containers and pressure developed in the other fluid container is transmitted to the valves through the said by-pass. A shock absorber constructed in this manner is described in United States Patent No. 2,450,731.

According to the primary feature of the invention, there is provided a shock absorber of the type above described, in which, in respect of each of the nested valves, one of the interengaging surfaces of the valve and the seat against which it closes is conical and the other is a rounded corner to engage the conical surface. This formation of the interengaging surfaces will facilitate close seating and small pieces of grit or the like will be unlikely to become caught between the interengaging surfaces and cause seepage. The amount of rounding of the corners should be as little as possible and need not be more than the removal of a cutting edge. It is preferred to make the valves and the seats of hardened steel.

In a preferred arrangement, the nested valves are carried in an end cap for one of the fluid containers of the shock absorber with the outer of the two valves arranged to close against a seat presented by the metering rod. The metering rod may terminate short of the nested valves and carry a tubular extension which provides the seat against which the outer valve closes.

Conveniently, the inner of the nested valves is of mushroom formation with its stem located axially in the outer valve and its head arranged to close against a seat provided by the outer valve.

In some circumstances it is advantageous to arrange that the aforesaid tubular extension on the metering rod provides a one-way bleed passage between the two fluid containers of the shock absorber to relieve minor accumulations of pressure in one of the fluid containers such as are insufficient to open the appropriate one of the nested valves.

For a more complete understanding of the invention, there will now be described, by way of example only and with reference to the accompanying drawing, one construction of shock absorber according to the invention. It is to be understood, however, that the invention is not restricted to the precise constructional details set forth.

In this drawing, the single figure is a sectional view of the shock absorber.

It will be seen that this construction follows the same general lines as that shown in Figure 1 of the drawings of United States Patent No. 2,450,731, mentioned above, and comprises a casing 15 with an upstanding centre barrel 16 having a cover plate 17. At the sides there are lugs 18 whereby the casing is mounted in place, and the barrel 16 provides bearings for a rock shaft 21 which is connected to one of the parts to be controlled by the shock absorber. The casing 15 has fluid containers 28 and 29 in which are pistons 30 and 31 which are received on a sleeve 32. The outer ends of the cylinders 28 and 29 have end caps 40 and 41 into the end cap 41 of which a metering rod 94 is screwed. The metering rod 94 reaches right through the interior of the sleeve 32 and the restricted passage through which the damping fluid passes between the cylinders 28 and 29 lies between the opposed surfaces of the sleeve 32 and the metering rod 94. The barrel 16 constitutes a recuperator chamber from which there is made up any loss of damping fluid from the two cylinders.

In use, it will be appreciated that the fluid will be forced from the cylinder 28 to the cylinder 29 and vice versa along the restricted passage between the sleeve 32 and the metering rod 94 as the rock shaft oscillates.

At the right hand end of the metering rod 94, as seen in the drawing, there are lateral conduits 112 establishing communication between the interior of the cylinder 29 and the interior of the rod 94, which constitutes a by-pass for the restricted passage between the sleeve 32 and rod 94.

The reference numerals thus far employed are as in United States Patent No. 2,450,731.

In carrying out the present invention, the bore 200 of the end cap 40 is enlarged, and this cap has a still larger tubular extension 201 which reaches into the cylinder 28 to screw on to the outside of a tubular extension 202 which is brazed on to the outside of the end of the metering rod 94, the latter being shorter than as shown in United States Patent No. 2,450,731.

The nested valves 203 and 204 according to the present invention are received in the bore 200 in the end cap 40 so as to lie axially opposite to the metering rod, the ends of the valves reaching into the bore of the tubular extension 202. The outer valve 203 has at one end a conical surface 205, converging towards the metering rod, and this conical surface closes against the slightly rounded inner edge 206 of the extremity of the extension 202, being urged in this direction by a coiled compression spring 207 located between the other end 208 of the valve 203 and the inner end face of the end cap 40.

The inner valve 204 lies with its head immediately opposite to, but clear of, the aforesaid by-pass in the metering rod. The head is coned at 209 in the opposite direction to the cone 205 on the valve 203, and the stem 210 reaches axially right through a bore in the valve 203 and has a collar 211 on its extremity, between which and the opposed end 208 of the outer valve a coiled compression spring 212 is located. This spring 212, and the collar 211 against which it presses, are situated inside the spring 207 controlling the outer valve 203. Their effect is to urge the conical face 209 on the head of the inner valve 204 to close against the slightly rounded edge at the end of the bore in the outer valve 203. In some circumstances the spring 212 controlling the inner valve may be weaker than the spring 207 controlling the outer valve, but both springs should be strong enough to withstand pressures of several hundred pounds per square inch in the damping fluid without permitting the valves to open.

The extension 201 on the end cap 40 is radially perforated at 213 to establish communication between the cylinder 28 and the interior of the extension 201 around the outer valve 203, and more or less midway of its length the outer valve 203 has on its outer surface a groove 214 from the base of which radial passages 215 extend to an enlarged part 216 of the bore of the outer valve, i. e. around the stem of the inner valve. The presence of the groove 214 enables the radial passages 215 to be quite short, thus avoiding surging. The enlarged part 216 of the bore extends between the inner ends of the radial passages 215 and the end of the bore against which the inner valve 204 closes so that damping fluid in the cylinder 28 can exert pressure on the head of the inner valve 204 to open it. As the enlargement is annular, a steady pressure may be maintained. To vary the flow, interchangeable outer valves with annular enlargements of different diameters may be provided.

From the foregoing it will be appreciated that excess pressure in the cylinder 28 can open the inner valve 204 to allow the fluid to flow through the by-pass in the metering rod 94 to the cylinder 29, whereas excess pressure in the cylinder 29, exerted through the by-pass in the metering rod, can open the outer valve 203 to allow fluid to flow to the cylinder 28. When the outer valve 203 opens, the inner valve 204 moves with it, remaining closed.

In some circumstances it may be advantageous to provide a one-way bleed passage to relieve minor accumulations of pressure in one cylinder. For instance, this one-way passage may be arranged to permit minor upward movements of the wheels of a motor car relatively to the body thereof to occur more easily than the return movements of the wheels. Similarly the strength of the springs for the nested valves may be so correlated as to permit major upward movements of the wheels to occur more easily than the return movements. The aforesaid bleed passage may be formed in the extension 202 on the metering rod 94 and, as shown, consists of a radial passage 217 opening at its inner end into the bore of the said extension, the passage being enlarged at 218 beyond its inner end to constitute a seat for a ball valve 219. The outer end of the radial passage 217, 218 leads into a longitudinal bore in the extension 202, which bore loosely houses a split pin 220, one end of which overlies the ball valve 219 to prevent undue displacement thereof and the other end of which reaches into the interior of the cylinder 28 to facilitate removal when necessary. Thus fluid under pressure in the cylinder 29 can pass through the by-pass in the metering rod and bleed around the split pin 220 into the cylinder 28, by-passing the restricted passage around the metering rod, even though the pressure is not high enough to open the outer of the nested valves.

It is to be understood that the invention is not restricted to the precise constructional details set forth.

I claim:

In a double-acting shock absorber in which fluid friction is employed for damping, comprising two fluid containers at the opposite ends of the shock absorber, a piston reciprocable in said containers, a hollow metering rod which reaches through a perforation so situated in the interior of the shock absorber that the opposed surfaces of the perforation and metering rod provide between them a restricted passage connecting the said fluid containers, through which passage the fluid is forced by the said piston, and the interior of which metering rod constitutes a by-pass for the said restricted passage to relieve the pressure set up by the flow of fluid through the said restricted passage in both directions, the metering rod being formed with lateral conduits extending through its wall from the interior to the exterior of said rod at a portion located in the other of the fluid containers so that pressure developed in the latter fluid container is transmitted through the said by-pass, the combination of two valves, nested together, to control the travel of the fluid and appropriated one to each direction of travel of the fluid and both operated by the pressure of the fluid, seats against which said valves close, one of the interengaging surfaces of each valve and its seat being conical and the other a rounded corner to engage the conical surface, and spring means tending to close said valves against their seats.

ERNEST WILLIAM JOHNSON.

REFERENCES CITED

The following references are of record in the file of this patent:

UNITED STATES PATENTS

| Number | Name | Date |
|---|---|---|
| 2,331,782 | Johnson | Oct. 12, 1943 |
| 2,358,714 | Johnson | Sept. 19, 1944 |